United States Patent
Fukumoto et al.

(10) Patent No.: US 9,964,757 B2
(45) Date of Patent: May 8, 2018

(54) LASER SCANNING MICROSCOPE APPARATUS AND CONTROL METHOD

(71) Applicant: Sony Corporation, Tokyo (JP)

(72) Inventors: Atsushi Fukumoto, Kanagawa (JP); Masaaki Hara, Tokyo (JP); Yoshiki Okamoto, Kanagawa (JP); Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 14/612,629

(22) Filed: Feb. 3, 2015

(65) Prior Publication Data
US 2015/0226949 A1 Aug. 13, 2015

(30) Foreign Application Priority Data
Feb. 10, 2014 (JP) .................... 2014-023303

(51) Int. Cl.
*G02B 21/00* (2006.01)
*G02B 26/10* (2006.01)

(52) U.S. Cl.
CPC ......... *G02B 26/101* (2013.01); *G02B 21/002* (2013.01); *G02B 21/0036* (2013.01)

(58) Field of Classification Search
CPC ........ G11B 5/127; G02B 21/08; G02B 25/00; G02B 21/00; G02B 21/364; G02B 21/008; G02B 21/0032; G02B 21/241; G02B 7/28; G02B 21/02; G02B 21/04; G02B 3/14; G01B 9/04; A61B 19/52; A61B 19/5223; A61B 19/26; G01N 1/06
See application file for complete search history.

(56) References Cited

U.S. PATENT DOCUMENTS

| | | |
|---|---|---|
| 5,981,956 A | 11/1999 | Stern |
| 6,313,452 B1 | 11/2001 | Paragano et al. |
| 8,081,208 B2 | 12/2011 | Inomata et al. |
| 9,012,872 B1 | 4/2015 | Fang et al. |
| 9,304,085 B2 | 4/2016 | Watanabe et al. |
| 9,338,408 B2 | 5/2016 | Kishima et al. |
| 9,496,685 B2 | 11/2016 | Fujita et al. |
| 9,739,715 B2 | 8/2017 | Watanabe et al. |
| 2007/0253056 A1 | 11/2007 | Tanemura et al. |
| 2009/0168157 A1 | 7/2009 | Tsurumune |
| 2009/0284853 A1* | 11/2009 | Griffiths ................... G02B 7/08 359/824 |
| 2010/0265323 A1 | 10/2010 | Perz |
| 2010/0284024 A1* | 11/2010 | Vucinic ................ G02B 27/126 356/602 |

(Continued)

FOREIGN PATENT DOCUMENTS

| | | |
|---|---|---|
| JP | 10-090606 A | 4/1998 |
| JP | 2013-003338 A | 1/2013 |

*Primary Examiner* — Jennifer L. Doak
(74) *Attorney, Agent, or Firm* — Wolf, Greenfield & Sacks, P.C.

(57) ABSTRACT

There is provided a laser scanning microscope apparatus including a first moving part equipped with an objective lens and configured to move the objective lens in a first direction, and a second moving part configured to be movable in a second direction orthogonal to the first moving part and equipped with the first moving part and a reflecting mirror that guides laser light radiated to an observation object and returning light of the observation object in a predetermined direction.

11 Claims, 9 Drawing Sheets

(56) References Cited

U.S. PATENT DOCUMENTS

| | | |
|---|---|---|
| 2012/0007977 A1 | 1/2012 | Yamamoto et al. |
| 2012/0098950 A1 | 4/2012 | Zheng et al. |
| 2013/0063565 A1 | 3/2013 | Hara et al. |
| 2013/0070054 A1 | 3/2013 | Takaya |
| 2013/0128024 A1 | 5/2013 | Kishima |
| 2013/0135456 A1 | 5/2013 | Kishima et al. |
| 2013/0229493 A1 | 9/2013 | Ikuta et al. |
| 2014/0247379 A1* | 9/2014 | Najmabadi ........ G01N 21/6458 348/295 |
| 2015/0115176 A1 | 4/2015 | Watanabe et al. |
| 2015/0143274 A1 | 5/2015 | Hecht et al. |
| 2015/0177501 A1 | 6/2015 | Kishima et al. |
| 2015/0185456 A1 | 7/2015 | Kishima |
| 2015/0241681 A1 | 8/2015 | Hara et al. |
| 2015/0325980 A1 | 11/2015 | Fujita et al. |
| 2016/0178524 A1 | 6/2016 | Watanabe et al. |
| 2016/0299170 A1 | 10/2016 | Ito et al. |

* cited by examiner

LASER SCANNING MICROSCOPE APPARATUS AND CONTROL METHOD

CROSS REFERENCE TO RELATED APPLICATIONS

This application claims the benefit of Japanese Priority Patent Application JP 2014-023303 filed Feb. 10, 2014, the entire contents of which are incorporated herein by reference.

BACKGROUND

The present disclosure relates to a laser scanning microscope apparatus and a method of controlling the apparatus.

As a technique to observe an object with high resolution, there are laser scanning microscope apparatuses. Such laser scanning microscope apparatus radiates laser light to an object, and while scanning the object with the laser light, detects intensity of the transmitted light, the backscattered light, fluorescence, Raman scattered light, and various types of light produced by the nonlinear optical effect, and the like. It is thus possible to acquire various types of information on the object as two-dimensional or three-dimensional image data.

FIG. 12 illustrates one configuration example of a laser scanning microscope 1 in the past. As illustrated in FIG. 12, laser light emitted from a laser 10 transmits a pair of galvano-scanners 21, equipped with a pair of reflecting mirrors, and relay lens optical systems 22 and 23 to be introduced to an objective lens 26. The laser light collected from the objective lens 26 creates a small light focus spot on an observation object 5. The incident angle to the objective lens 26 is altered by changing the direction of the laser light with the galvano-scanners 21, which enables scanning of the light focus spot on the observation object 5. Reflected light or fluorescence from the observation object 5 is detected via the objective lens 26, a half mirror or a wavelength separating mirror 24 by a photodetector 27. The laser scanning microscope 1 generates a two-dimensional image based on a photodetector signal corresponding to the light focus spot position detected by the photodetector 27.

In such laser scanning microscope 1, a high resolution lens to generate a smaller light focus spot has a narrow visual field in general and has a narrow image acquisition area. In the objective lens 26 of the laser scanning microscope 1 in the past, the resolution and the visual field (that is, image acquisition area) are in relationship of so-called trade-off. In addition, when using the galvano-scanners 21 for the optical system as in the laser scanning microscope 1 described above, the relatively large size becomes an obstacle to miniaturization of the microscope apparatus.

JP H10-90606A, for example, discloses a miniature confocal microscope utilizing a low-mass objective lens. In such confocal microscope, a drive system to drive the objective lens is configured with an electromagnetic voice coil that is supported by a flexible material and cooperates with a permanent magnet on a fixed portion of an optical assembly.

SUMMARY

However, in the confocal microscope in JP H10-90606A, it is possible to achieve miniaturization of the apparatus while it used to be difficult to acquire an image of a wide visual field.

Proposed are a novel and improved laser scanning microscope apparatus, capable of miniaturizing the apparatus and also acquiring an image of a wide visual field, and a method of controlling the apparatus.

According to an embodiment of the present disclosure, there is provided a laser scanning microscope apparatus including a first moving part equipped with an objective lens and configured to move the objective lens in a first direction, and a second moving part configured to be movable in a second direction orthogonal to the first moving part and equipped with the first moving part and a reflecting mirror that guides laser light radiated to an observation object and returning light of the observation object in a predetermined direction.

According to another embodiment of the present disclosure, there is provided a control method, in a laser scanning microscope apparatus including a first moving part equipped with an objective lens and configured to move the objective lens in a first direction, and a second moving part configured to be movable in a second direction orthogonal to the first moving part and equipped with the first moving part and a reflecting mirror that guides laser light radiated to an observation object and returning light of the observation object in a predetermined direction, the method including controlling moving speed of the first moving part to be at a speed higher than moving speed of the second moving part.

According to an embodiment of the present disclosure, there is provided an apparatus which includes a first moving part equipped with an objective lens, and a second moving part configured to be movable in a direction orthogonal to the first moving part and equipped with the first moving part and a reflecting mirror. Since the apparatus is configured with small optical components without using a galvano-scanner unlike in the past, this enables miniaturization and slimming of the apparatus. It is also possible to acquire, at high speed, an image of a wide visual field with high resolution by reducing elements to be equipped in each moving part for weight saving.

According to one or more embodiments of the present disclosure, as just described, it is possible to miniaturize the apparatus and also to acquire an image of a wide visual field. The above effects are not exclusive but any of the effects herein or other effects understood from this specification may also be exhibited together with the above effects or instead of the above effects.

DETAILED DESCRIPTION OF THE EMBODIMENTS

Figure 1:
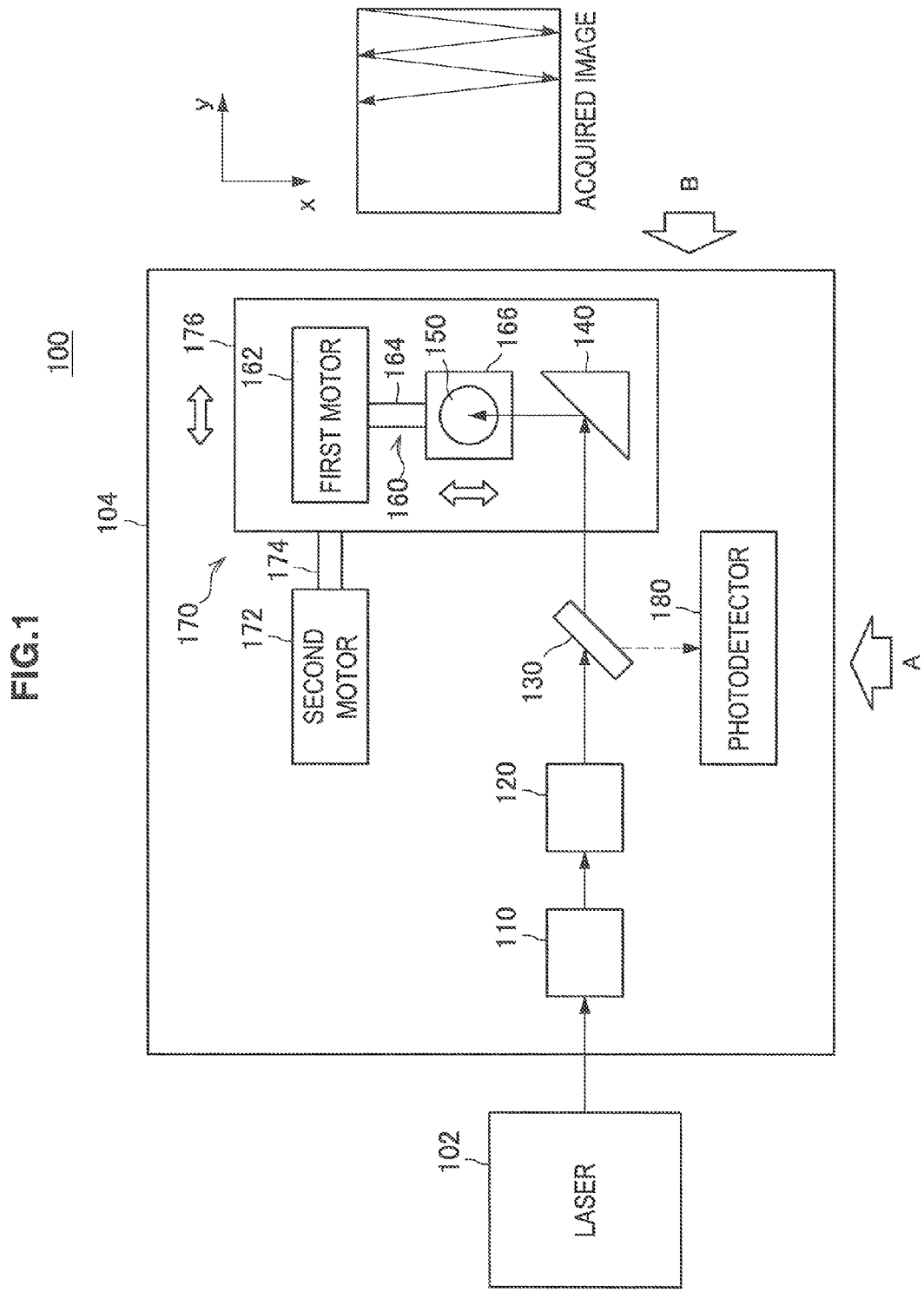
FIG. 1 is a schematic block diagram illustrating a configuration of a laser scanning microscope apparatus according to a first embodiment of the present disclosure and illustrates a state of plan view.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The descriptions are given in the following order.

1. First Embodiment (First Moving Part: Rectilinear Movement, Second Moving Part: Rectilinear Movement)
   1. 1. Configuration of Laser Scanning Microscope Apparatus
   1. 2. Scanning of Light Focus Spot
   1. 3. Summary
2. Second Embodiment (First Moving Part: Rotational Movement, Second Moving Part: Rectilinear Movement)
   2. 1. Configuration of Laser Scanning Microscope Apparatus
   2. 2. Scanning of Light Focus Spot
   2. 3. Summary

1. First Embodiment

1. 1. Configuration of Laser Scanning Microscope Apparatus

Figure 2:
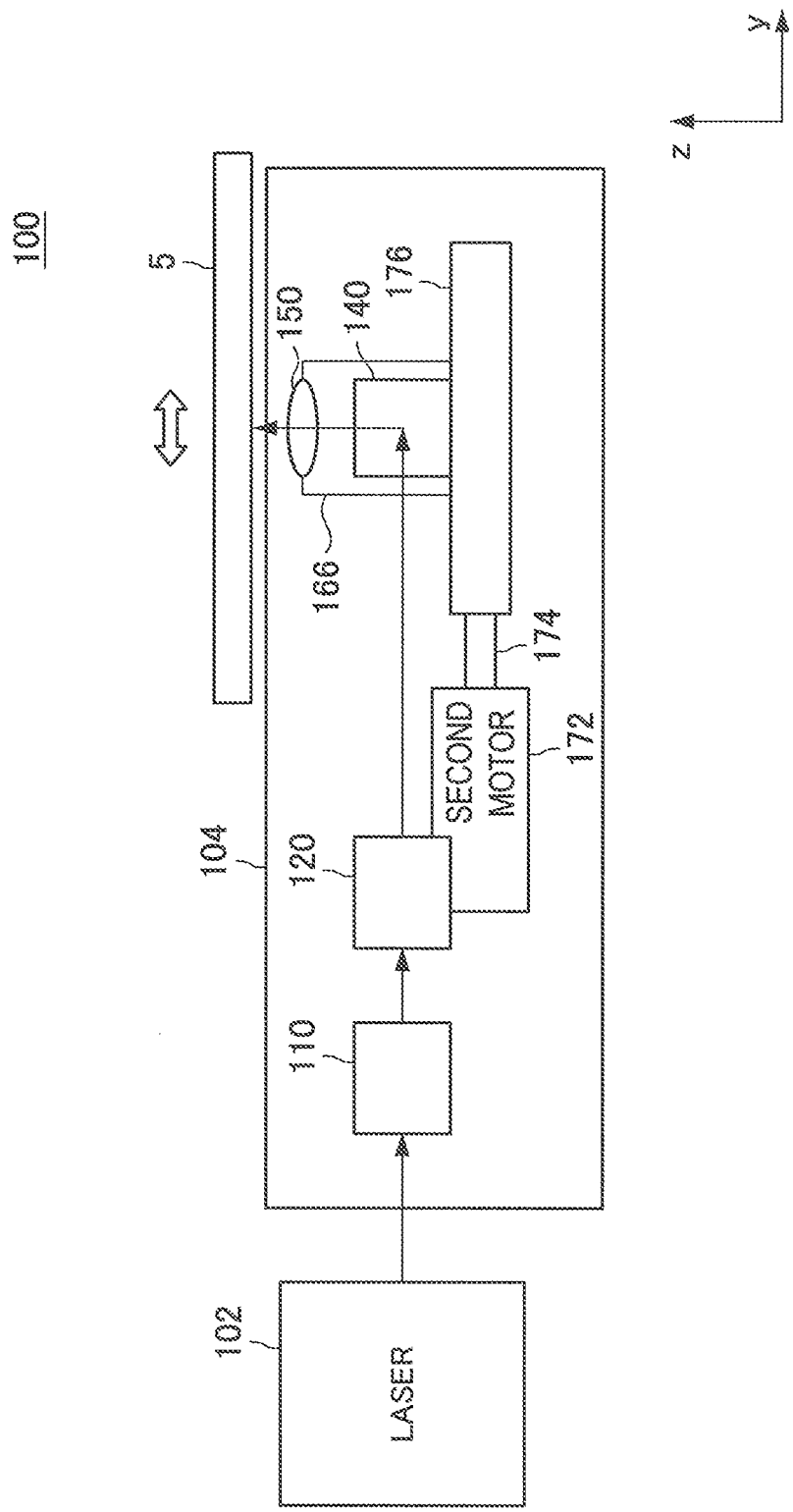
FIG. 2 is a schematic front view illustrating a state of the laser scanning microscope apparatus in FIG. 1 taken from an arrow A side.
Figure 3:
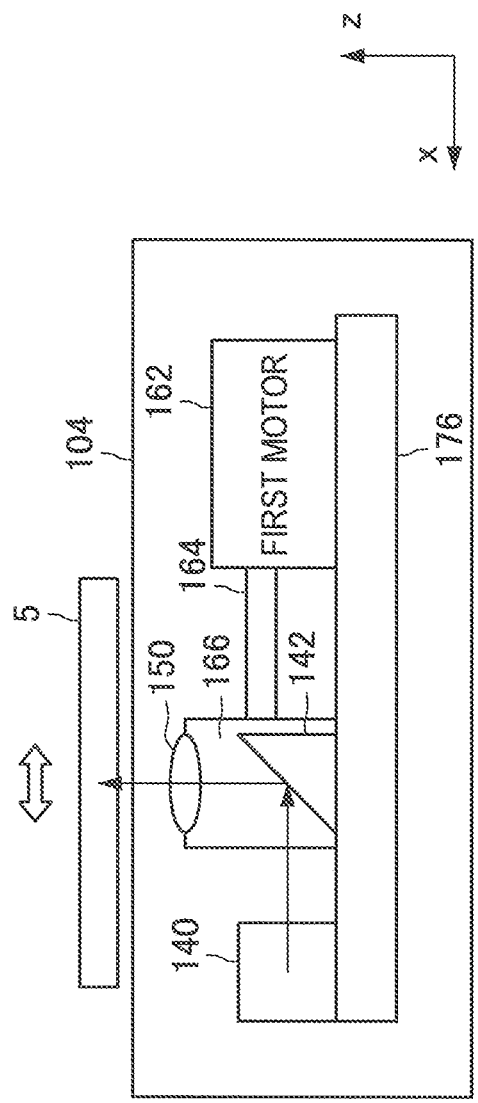
FIG. 3 is a schematic side view illustrating a state of the laser scanning microscope apparatus in FIG. 1 taken from an arrow B side.

Firstly, with reference to FIGS. 1 through 3, a configuration of a laser scanning microscope apparatus 100 according to a first embodiment of the present disclosure is described. FIG. 1 is a schematic block diagram illustrating a configuration of the laser scanning microscope apparatus 100 according to the present embodiment and illustrates a state of plan view. FIG. 2 is a schematic front view illustrating a state of the laser scanning microscope apparatus 100 in FIG. 1 taken from an arrow A side. FIG. 3 is a schematic side view illustrating a state of the laser scanning microscope apparatus 100 in FIG. 1 taken from an arrow B side.

The laser scanning microscope apparatus 100 according to the present embodiment includes a laser 102 to emit light and an image acquisition unit 104 to scan an observation object with light emitted from the laser 102 and detect reflected light or fluorescence of the observation object for acquisition of a two-dimensional image.

The laser 102 emits laser light to be radiated to an observation object. The laser 102 may be, for example, a solid state laser and may also be a semiconductor laser. A medium (material) for the solid state laser and the semiconductor laser may be appropriately selected to emit laser light in a desired wavelength bandwidth in accordance with applications of the laser scanning microscope apparatus 100.

The image acquisition unit 104 includes a spherical aberration correction unit 110, a focus position control unit 120, a beam splitter 130, a reflecting mirror 140, and an objective lens 150.

Figure 4:
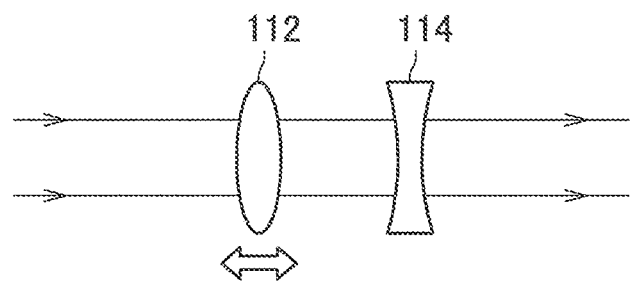
FIG. 4 is a diagram illustrating one configuration example of a spherical aberration correction unit and illustrates an example of being configured with a convex lens and a concave lens.

The spherical aberration correction unit 110 is an optical system to correct spherical aberration. The spherical aberration correction unit 110 may be configured with, for example, a convex lens 112 and a concave lens 114 as illustrated in FIG. 4. Laser light, which is parallel light, emitted from the laser 102 passes through the convex lens 112 and the concave lens 114 functioning as the spherical aberration correction unit 110. At this time, either one of the convex lens 112 and the concave lens 114 is moved in an optical axis direction to change the position on the optical axis, and thus it is possible to alter the amount of spherical aberration to be produced. In general, it is possible to achieve the spherical aberration correction unit 110 by changing the position in the optical axis direction of at least one lens in a group of two or more lenses.

Figure 5:
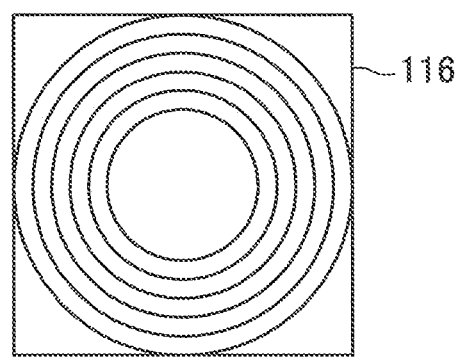
FIG. 5 is a diagram illustrating one configuration example of the spherical aberration correction unit and illustrates an example of being configured with a concentric multifractionated liquid crystal phase element.
Figure 6:
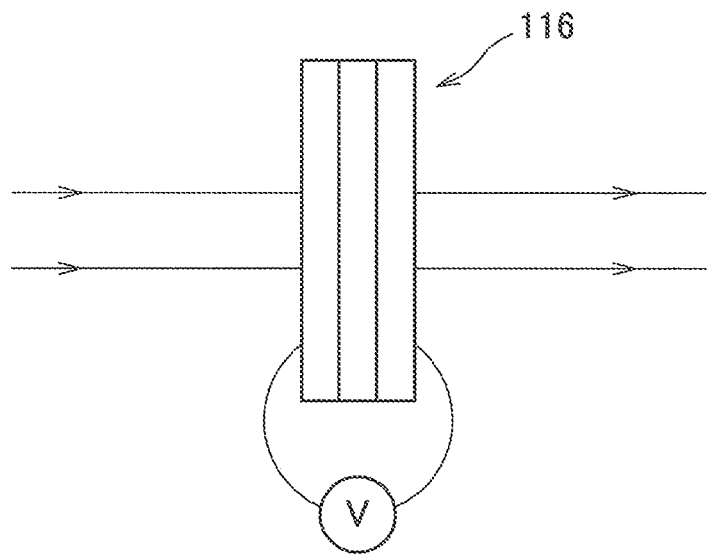
FIG. 6 is a schematic side view of FIG. 5.

Alternatively, the spherical aberration correction unit 110 may also be configured using a concentric multifractionated liquid crystal phase element 116 as illustrated in FIGS. 5 and 6. The concentric multifractionated liquid crystal phase element 116 has annularly formed electrodes of a liquid crystal panel, and these annular electrodes are disposed to be concentric. By applying an electric field individually to each region partitioned by the concentric annular electrodes of the concentric multifractionated liquid crystal phase element 116, phase distribution is applied to the laser light transmitting the concentric multifractionated liquid crystal phase element 116. For example, by applying a phase of a quartic function in a radial direction, it is possible to apply an arbitrary amount of spherical aberration.

Figure 7:
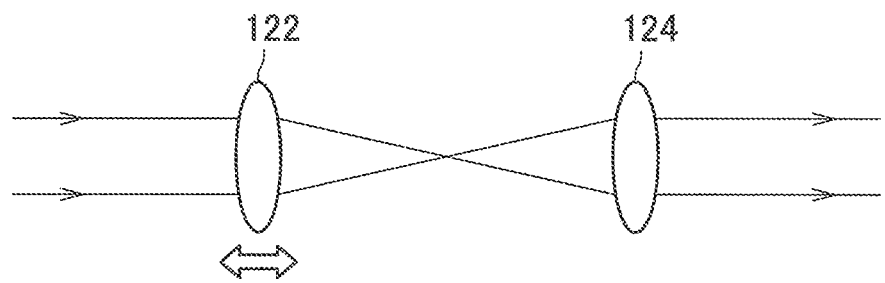
FIG. 7 is a diagram illustrating one configuration example of a focus position control unit and illustrates an example of being configured with two convex lenses.

The focus position control unit 120 is an optical system to adjust a focus position of the objective lens 150. The focus position control unit 120 may also be configured with, for example, two convex lenses 122 and 124 as illustrated in FIG. 7. The laser light, which is parallel light, emitted from the spherical aberration correction unit 110 passes through the convex lenses 122 and 124 functioning as the focus position control unit 120. At this time, either one of the convex lenses 122 and 124 is moved in the optical axis direction to change the position on the optical axis, and thus it is possible to alter an amount of defocus to be produced and to change the focus position of the objective lens 150. In general, it is possible to achieve the focus position control unit 120 by changing a position in the optical axis direction of at least one lens in a group of two or more lenses.

Alternatively, the focus position control unit 120 may also be configured using the concentric multifractionated liquid crystal phase element 116 in a manner same as the spherical aberration correction unit 110 as illustrated in FIGS. 5 and 6. By applying an electric field individually to each region partitioned by the concentric annular electrodes of the concentric multifractionated liquid crystal phase element 116, phase distribution is applied to the laser light transmitting the concentric multifractionated liquid crystal phase element 116. For example, by applying a phase of a quadratic function in a radial direction, it is possible to apply an arbitrary amount of defocus.

The beam splitter 130 is an optical system to guide light introduced from one direction and light introduced from another direction in directions different from each other. As the beam splitter 130, for example, a half mirror may be used in which the intensity of reflected light and the intensity of transmitted light are approximately same. Instead of the beam splitter 130, a wavelength separating mirror, such as a dichroic mirror to reflect light of a specific wavelength and to transmit light of the other wavelengths, may also be used. The laser light introduced from the focus position control unit 120 to the beam splitter 130 passes through the beam splitter 130 and is led to the reflecting mirror 140. In addition, returning light of the laser light radiated to the observation object 5 is introduced to the beam splitter 130 from the reflecting mirror 140. The returning light is reflected by the beam splitter 130 and led to a photodetector 180.

The reflecting mirror 140 is an optical system to reflect light and guide the light in a predetermined direction. In the present embodiment, the reflecting mirror 140 is placed on a second base 176 of a second moving part 170 described later. The reflecting mirror 140 reflects the laser light introduced from the beam splitter 130 and guides the light to the objective lens 150. In addition, the reflecting mirror 140 reflects returning light of the laser light radiated to the observation object 5 and guides the light to the beam splitter 130.

The objective lens 150 is a lens to firstly create an image of the observation object 5. The objective lens 150 collects the laser light introduced from the reflecting mirror 140 and forms a light focus spot on the observation object 5. The objective lens 150 is provided to be movable on a plane by a first moving part 160 and the second moving part 170 that are described later. It is possible to move the position of the light focus spot by the objective lens 150 by changing the position of the objective lens 150 by the first moving part 160 and the second moving part 170. Details of the behaviors when scanning the observation object 5 by the objective lens 150 are described later. As the returning light of the laser light radiated to the observation object 5 is introduced, the objective lens 150 guides the light to the reflecting mirror 140.

The first moving part 160 is a rectilinear drive mechanism to move the objective lens 150 in a predetermined direction (first direction, x direction in the present embodiment). The first moving part 160 includes a first motor 162, a first drive shaft 164, and a first base 166. The first motor 162 is a driving source (first driving unit) to move the objective lens 150 fixed to the first base 166 in the x direction and it is possible to use, for example, a voice coil motor, a stepping motor, and the like. Here, extreme high speed compared with the second moving part 170 is demanded for the first moving part 160 equipped with the objective lens 150, so that it is appropriate to use a voice coil motor.

Figure 8:
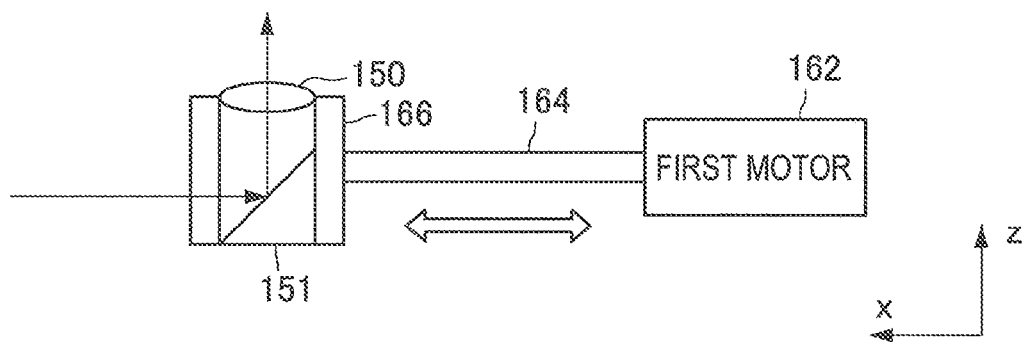
FIG. 8 is a diagram illustrating one configuration example of an objective lens provided with a reflecting mirror.

The first base 166 holds the objective lens 150. The objective lens 150 is provided, for example, to face the observation object 5 as illustrated in FIG. 8. At this time, the first base 166 is provided with a reflecting mirror 151 on a side opposite to the side to dispose the observation object 5 relative to the objective lens 150. The reflecting mirror 151 guides the light between the reflecting mirror 140 and the objective lens 150.

Figure 9:
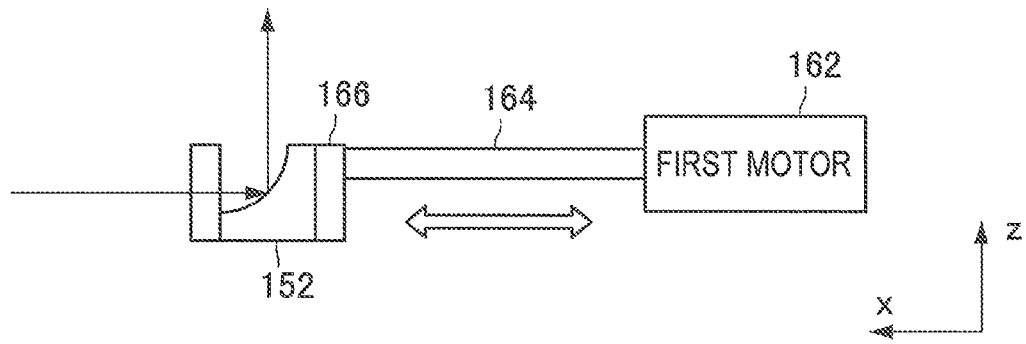
FIG. 9 is a diagram illustrating a reflecting objective lens.

The objective lens may also be, for example, a reflecting objective lens 152 in which the objective lens 150 and the reflecting mirror 151 illustrated in FIG. 8 are integrated as illustrated in FIG. 9. In the reflecting objective lens 152, the surface to which the laser light from the reflecting mirror 140 and the returning light from the observation object 5 are introduced is curved. The laser light from the reflecting mirror 140 is radiated to the observation object 5 by the curve and the returning light from the observation object 5 is guided to the reflecting mirror 140 by the curve.

The first motor 162 is coupled to the first base 166 via the first drive shaft 164, and the first base 166 is subjected to periodic reciprocating rectilinear movement by the first motor 162. The objective lens 150 is thus subjected to periodic reciprocating rectilinear movement in the x direction. The first moving part 160 is placed on the second base 176 that configures the second moving part 170. Accordingly, the first moving part 160 is provided to be movable in a predetermined direction (y direction) by the second moving part 170.

The second moving part 170 is a linear actuator to move, in a predetermined direction (second direction, y direction in the present embodiment), the reflecting mirror 140, the objective lens 150, and the first moving part 160 that holds and moves the objective lens 150 in the x direction. The second moving part 170 includes a second motor 172, a second drive shaft 174, and the second base 176. The second motor 172 is a driving source (second driving unit) to move the reflecting mirror 140, the objective lens 150, and the first moving part 160 that are placed on the second base 176 in the y direction, and for example, it is possible to use a voice coil motor, a stepping motor, and the like.

The second motor 172 is coupled to the second base 176 via the second drive shaft 174, and the second base 176 is subjected to periodic reciprocating rectilinear movement by the second motor 172. The reflecting mirror 140 and the objective lens 150 are thus subjected to periodic reciprocating rectilinear movement in the y direction.

The photodetector 180 receives the returning light of the laser light radiated to the observation object 5 and generates a two-dimensional image. The photodetector 180 may have a light receiving element, such as a photodiode and a photo multiplier tube (PMT), for example. The photodetector 180 may also have various imaging elements, such as a charge coupled device (CCD) and a complementary metal oxide semiconductor (CMOS), for example. The photodetector 180 is capable of detecting the returning light produced by scanning the observation object 5 with the laser light continuously (when the laser light is CW laser) or intermittently (when the laser light is pulse laser) in the order of scanning with the laser light.

The laser scanning microscope apparatus 100 according to the present embodiment is provided with a control unit (not illustrated) to control the apparatus in an integrated manner. The control unit performs, for example, laser scanning control to the observation object 5 and various types of image signal processing to an image signal obtained as a result of the laser scanning. The control unit also controls moving speed of the first moving part 160 and moving speed of the second moving part 170.

In such laser scanning microscope apparatus 100, the laser light emitted from the laser 102 in the a y direction passes through the spherical aberration correction unit 110 and the focus position control unit 120 and is guided to the reflecting mirror 140 on the second base 176 of the second moving part 170. The laser light reflected in the x direction by the reflecting mirror 140 is reflected in a z direction by the reflecting mirror 151 on the first base 166 of the first moving part 160 to be introduced to the objective lens 150.

The laser light radiated from the objective lens 150 to the observation object 5 is reflected on the observation object 5. After being guided in the z direction from the objective lens 150 to the reflecting mirror 151, the returning light is reflected in the x direction by the reflecting mirror 151 to be introduced to the reflecting mirror 140. The reflecting mirror 140 reflects the introduced returning light in the y direction and guides the light to the beam splitter 130. The beam splitter 130 reflects the introduced returning light and guides the light to the photodetector 180. The photodetector 180 detects the returning light and generates a two-dimensional image based on the position of the objective lens 150, that is, the photodetector signal corresponding to the light focus spot position.

1. 2. Scanning of Light Focus Spot

The laser light collected by the objective lens 150 creates a small light focus spot on the observation object 5. Here, in the laser scanning microscope apparatus 100 according to the present embodiment, the first moving part 160 and the second moving part 170 perform rectilinear reciprocating motion in a direction orthogonal to each other using the independent motors 162 and 172 as the driving sources and changes the position of the objective lens 150 in the two-dimensional plane. Since the light focus spot is generated at the center of the objective lens 150, it is possible to scan the observation object 5 by movement of the objective lens 150.

To describe in more detail, firstly, the first moving part 160 is configured to be movable in a direction parallel to the optical axis of the laser light to be introduced from the reflecting mirror 140 to the reflecting mirror 151 disposed on the first base 166 of the first moving part 160 (that is, x direction). The second moving part 170 is configured to be movable in a direction parallel to the optical axis to be introduced to the reflecting mirror 140 disposed on the second base 176 of the second moving part 170 from the beam splitter 130 (that is, y direction). The objective lens 150 thus becomes movable in the x direction by the first moving part 160 and also becomes movable in the y direction orthogonal to the x direction by the second moving part 170.

Accordingly, it becomes possible to lead laser light to the center of the objective lens 150 at all times by the first moving part 160 and the second moving part 170. As a result, it becomes possible to use the simple lightweight objective lens 150, which significantly reduces load on the first motor 162 functioning as the driving source for the first moving part 160.

In addition, in the present embodiment, the first moving part 160 is equipped with the objective lens 150 and the second moving part 170 is equipped only with the first moving part 160 and the reflecting mirror 140. That is, in the laser scanning microscope apparatus 100 according to the present embodiment, the spherical aberration correction unit 110, the focus position control unit 120, the beam splitter 130, and the photodetector 180, for example, are not equipped in the moving parts and are fixed to a fixed part. Accordingly, it is possible to reduce members to be moved by the first moving part 160 and the second moving part 170 and to save the weight of the members to be equipped. It is possible to reduce the motor load in each of the moving part 160 and 170 by the weight saving, which enables high speed scanning of a light focus spot and image acquisition for a shorter period of time.

At this time, the control unit controls the moving speed of the first moving part 160 to be faster than the moving speed of the second moving part 170. This enables faster movement of the objective lens 150, high speed scanning of a light focus spot, and image acquisition for a shorter period of time. Further, by allowing independent driving of the first moving part 160 and the second moving part 170, it is possible to enlarge the visual field for a stroke of the motor to enhance the resolution.

1. 3. Summary

The configuration of the laser scanning microscope apparatus 100 according to the first embodiment and the behaviors of the apparatus when scanning a light focus spot are described above. The laser scanning microscope apparatus 100 according to the present embodiment is provided with the first moving part 160 equipped with the objective lens 150 and the reflecting mirror 151 and the second moving part 170 movable in a direction orthogonal to the first moving part 160 and equipped with the first moving part 160 and the reflecting mirror 140. Since the apparatus is configured with small optical components without using a galvano-scanner unlike in the past, this enables miniaturization and slimming of the apparatus. It is also possible to acquire, at high speed, an image of a wide visual field with high resolution by reducing elements to be equipped in each of the moving parts 160 and 170 for weight saving.

2. Second Embodiment

Figure 10:
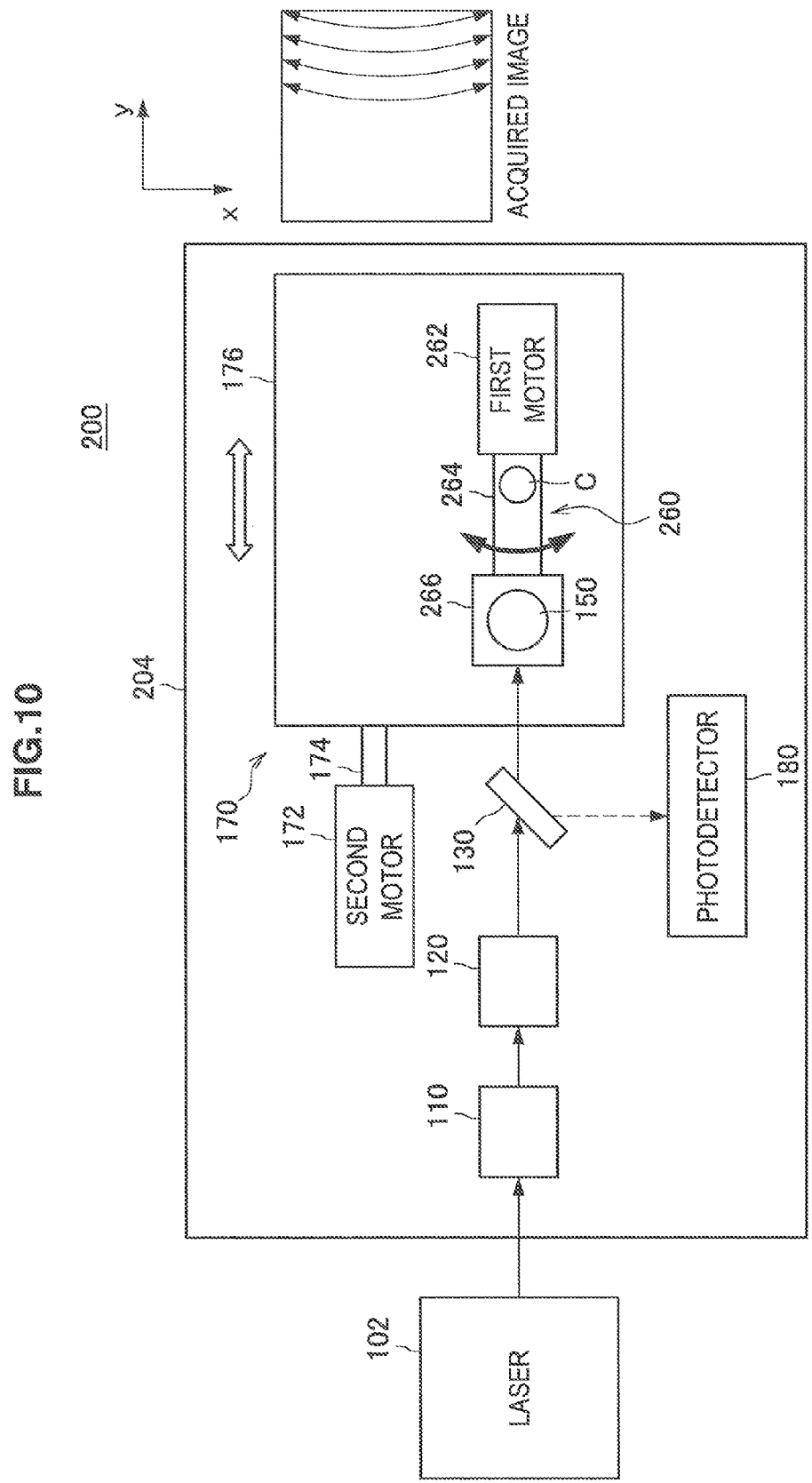
FIG. 10 is a schematic block diagram illustrating a configuration of a laser scanning microscope apparatus according to a second embodiment of the present disclosure and illustrates a state of plan view.
Figure 11:
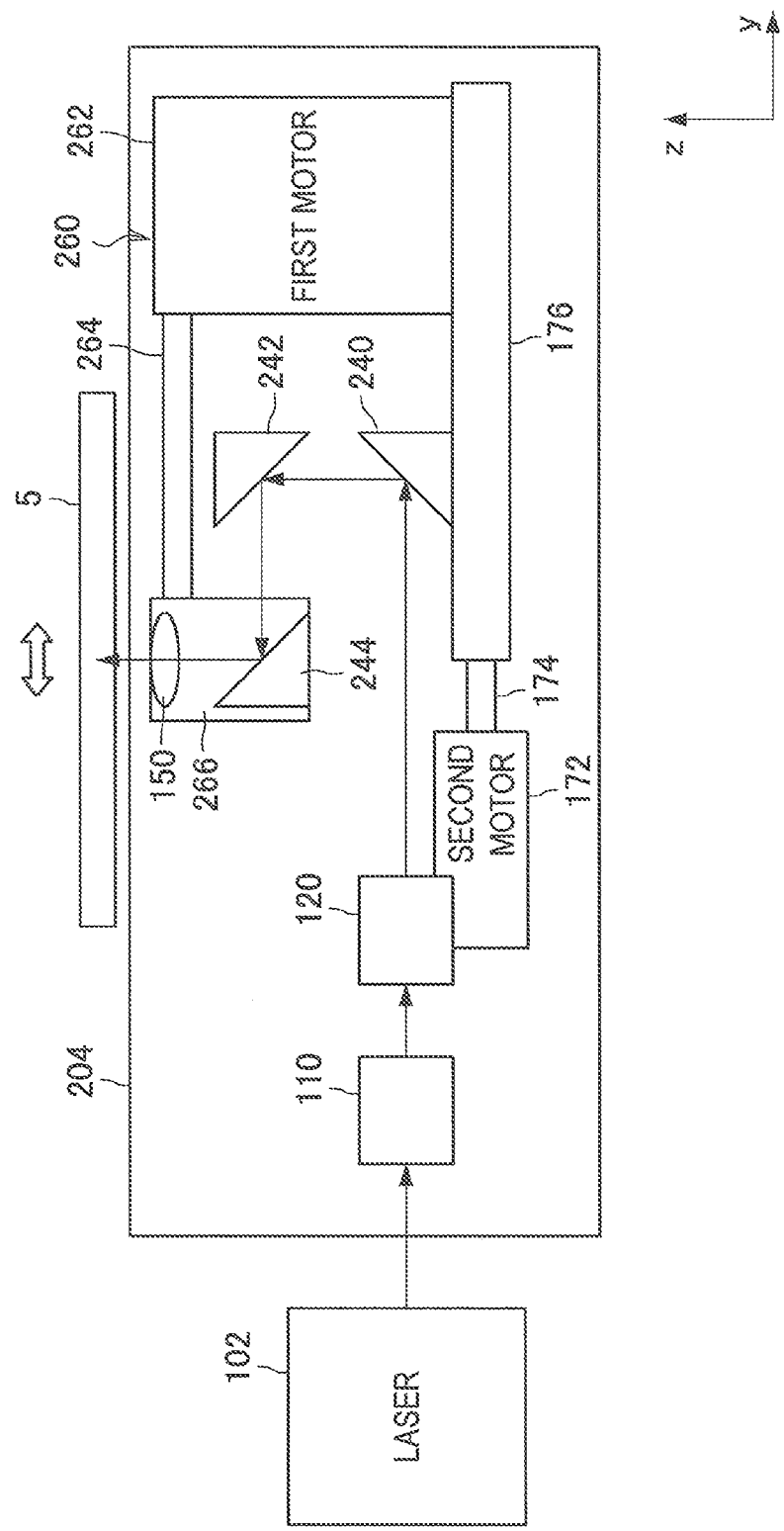
FIG. 11 is a schematic front view illustrating a state of the laser scanning microscope apparatus in FIG. 10 taken from an x axis forward direction side.
Figure 12:
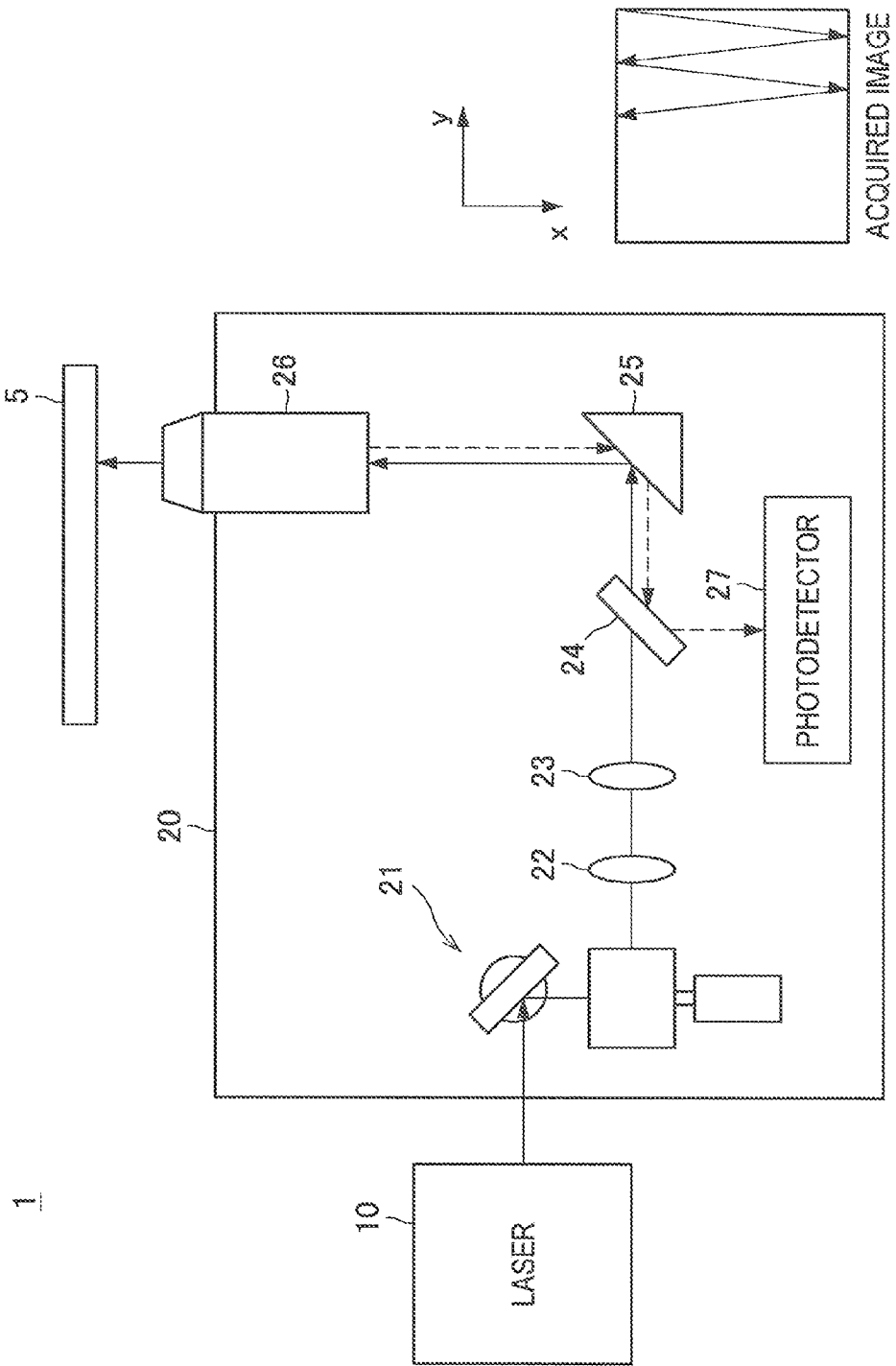
FIG. 12 is a diagram illustrating one configuration example of a laser scanning microscope according to a technique related to embodiments of the present disclosure.

Next, with reference to FIGS. 10 and 11, descriptions are given to a configuration of a laser scanning microscope apparatus 200 according to a second embodiment of the present disclosure. FIG. 10 is a schematic block diagram illustrating a configuration of the laser scanning microscope apparatus 200 according to the present embodiment and illustrates a state of plan view. FIG. 11 is a schematic front view illustrating a state of the laser scanning microscope apparatus 200 in FIG. 10 taken from an x axis forward direction side. The laser scanning microscope apparatus 200 according to the present embodiment differs in the behaviors of a first moving part 260 equipped with the objective lens 150 in comparison with the laser scanning microscope apparatus 100 according to the first embodiment.

Hereinafter, the configuration of the laser scanning microscope apparatus 200 according to the present embodiment and the behaviors of the apparatus when scanning a light focus spot are described. Note that, in the laser scanning microscope apparatus 200 illustrated in FIGS. 10 and 11, structural elements that have the function and structure same as the first embodiment are denoted with the same reference numerals, and detailed explanation of these structural elements is omitted.

2. 1. Configuration of Laser Scanning Microscope Apparatus

The laser scanning microscope apparatus 200 according to the present embodiment includes the laser 102 to emit light and an image acquisition unit 204 to scan an observation object with light emitted from the laser 102 and detect reflected light or fluorescence of the observation object for acquisition of a two-dimensional image.

The laser 102 emits laser light to be radiated to an observation object. The laser 102 may be configured in a manner same as the first embodiment. The laser light emitted by the laser 102 is introduced to an image acquisition unit 204.

The image acquisition unit 204 includes the spherical aberration correction unit 110, the focus position control unit 120, the beam splitter 130, a first reflecting mirror 240, a second reflecting mirror 242, a third reflecting mirror 244, and the objective lens 150.

The spherical aberration correction unit 110 is an optical system to correct spherical aberration. The spherical aberration correction unit 110 may be equivalent to the first embodiment, and for example, may also be configured with the convex lenses 122 and 124 and the concave lens 114 as illustrated in FIG. 4 and may also be configured using the concentric multifractionated liquid crystal phase element 116 as illustrated in FIGS. 5 and 6. After aberration correction of the laser light introduced from the laser 102, the spherical aberration correction unit 110 leads the light to the focus position control unit 120.

The focus position control unit 120 is an optical system to adjust a focus position. The focus position control unit 120 may be configured with, for example, the two convex lenses 122 and 124 as illustrated in FIG. 7 and may also use the concentric multifractionated liquid crystal phase element 116 in a manner same as the spherical aberration correction unit 110 as illustrated in FIGS. 5 and 6. After defocusing the laser light, the focus position control unit 120 leads the light to the beam splitter 130. The beam splitter 130 is an optical system to guide light introduced from one direction and light introduced from another direction in directions different from each other. As the beam splitter 130, in a manner similar to that in the first embodiment, for example, a half mirror may be used. Instead of the beam splitter 130, a wavelength separating mirror, such as a dichroic mirror, may also be used. The laser light introduced from the focus position control unit 120 to the beam splitter 130 passes through the beam splitter 130 and is led to the reflecting mirror 140. In addition, returning light of the laser light radiated to the observation object 5 is introduced to the beam splitter 130 from the reflecting mirror 140. The returning light is reflected by the beam splitter 130 and led to a photodetector 180.

The first reflecting mirror 240, the second reflecting mirror 242, and the third reflecting mirror 244 are optical systems to reflect laser light to guide in predetermined directions between the beam splitter 130 and the objective lens 150.

The first reflecting mirror 240 is placed on the second base 176 of the second moving part 170. The first reflecting mirror 240 reflects the laser light introduced from the beam splitter 130 and guides the light to the second reflecting mirror 242. The second reflecting mirror 242 is disposed above (z axis forward direction side) the first reflecting mirror 240. The second reflecting mirror 242 guides the laser light introduced from the first reflecting mirror 240 to the third reflecting mirror 244. The third reflecting mirror 244 is fixed to a first base 266 described later together with the objective lens 150. The third reflecting mirror 244 guides the laser light introduced from the second reflecting mirror 242 to the objective lens 150.

The first reflecting mirror 240, the second reflecting mirror 242, and the third reflecting mirror 244 reflects the returning light of the laser light radiated to the observation object 5 introduced from the objective lens 150 in order and guides the light to the beam splitter 130.

The objective lens 150 is a lens to firstly create an image of the observation object 5. The objective lens 150 collects the laser light introduced from the third reflecting mirror 244 and forms a light focus spot on the observation object 5. The objective lens 150 is provided to be movable on a plane by the first moving part 260 and the second moving part 170 that are described later. It is possible to move the position of the light focus spot by the objective lens 150 by changing the position of the objective lens 150 by the first moving part 260 and the second moving part 170. Details of the behaviors when scanning the observation object 5 by the objective lens 150 are described later. As the returning light of the laser light radiated to the observation object 5 is introduced, the objective lens 150 guides the light to the third reflecting mirror 244.

The first moving part 260 is a drive mechanism to move the objective lens 150 in a predetermined direction (first direction, x direction in the present embodiment). The first moving part 260 includes a first motor 262, a first rotational axis 264, and the first base 266. The first motor 262 is a driving source to rotate the objective lens 150 fixed to the first base 266 about a rotational axis C, and for example, it is possible to use a voice coil motor. Since extreme high speed compared with the second moving part 170 is demanded for the first moving part 260 equipped with the objective lens 150, it is appropriate to use a voice coil motor.

The first base 266 holds the objective lens 150. The objective lens 150 is provided to face the observation object 5 as illustrated in FIG. 11. At this time, the first base 266 is provided with the third reflecting mirror 244 on a side opposite to the side to dispose the observation object 5 relative to the objective lens 150. The objective lens may also be, other than the configuration illustrated in FIG. 11, the reflecting objective lens 152 in which the objective lens 150 and the third reflecting mirror 244 are integrated as illustrated in FIG. 9, for example.

The first motor 262 is coupled to the first base 266 via the first rotational axis 264, and the first base 266 is subjected to periodic reciprocating rotational movement by the first motor 262. The objective lens 150 is thus subjected to periodic reciprocating rotational movement on the xy plane. The first moving part 260 is placed on the second base 176 that configures the second moving part 170. Accordingly, the first moving part 260 is provided to be movable in a predetermined direction (y direction) by the second moving part 170.

The second moving part 170 is a linear actuator to move the first reflecting mirror 240, the objective lens 150, and the first moving part 260 to hold the objective lens 150 for rotational movement in a predetermined direction (second direction, y direction in the present embodiment). The second moving part 170 may be configured in a manner same as the first embodiment and includes the second motor 172, the second drive shaft 174, and the second base 176.

The second motor 172 is a driving source to move the first reflecting mirror 240, the second reflecting mirror 242, the third reflecting mirror 244, the objective lens 150, and the first moving part 260 that are placed on the second base 176 in the y direction. As the second motor 172, it is possible to use a voice coil motor, a stepping motor, and the like, for example. The second motor 172 is coupled to the second base 176 via the second drive shaft 174, and the second base 176 is subjected to periodic reciprocating rectilinear movement by the second motor 172. The first reflecting mirror 240 and the objective lens 150 are thus subjected to periodic reciprocating rectilinear movement in the y direction.

The photodetector 180 receives returning light of the laser light radiated to the observation object 5 and generates a two-dimensional image. The photodetector 180 may be configured in a manner same as the first embodiment. The laser scanning microscope apparatus 200 according to the present embodiment is provided with a control unit (not illustrated) to control the apparatus in an integrated manner. The control unit performs, for example, laser scanning control to the observation object 5 and various types of image signal processing to the image signal obtained as a result of the laser scanning. The control unit also controls moving speed of the first moving part 260 and moving speed of the second moving part 170.

In such laser scanning microscope apparatus 200, the laser light emitted from the laser 102 in the y direction passes through the spherical aberration correction unit 110 and the focus position control unit 120 and is guided to the first reflecting mirror 240 on the second base 176 of the second moving part 170. The laser light reflected by the first reflecting mirror 240 in the z direction is guided to the second reflecting mirror 242 and guided by the second reflecting mirror 242 in the y direction. The laser light reflected by the second reflecting mirror 242 in the y direction is guided to the third reflecting mirror 244 and reflected by the third reflecting mirror 244 in the z direction, and then introduced to the objective lens 150.

The laser light radiated from the objective lens 150 to the observation object 5 is reflected on the observation object 5. After being guided in the z direction from the objective lens 150 to the third reflecting mirror 244, the returning light is reflected in the y direction by the third reflecting mirror 244 to be introduced to the second reflecting mirror 242. The second reflecting mirror 242 reflects the introduced returning light in the z direction to be introduced to the first reflecting mirror 240. The first reflecting mirror 240 reflects the introduced returning light in the y direction and guides the light to the beam splitter 130. The beam splitter 130 reflects the introduced returning light and guides the light to the photodetector 180. The photodetector 180 detects the returning light and generates a two-dimensional image based on the position of the objective lens 150, that is, the photodetector signal corresponding to the light focus spot position.

2. 2. Scanning of Light Focus Spot

The laser light collected by the objective lens 150 creates a small light focus spot on the observation object 5. Here, in the laser scanning microscope apparatus 200 according to the present embodiment, the second moving part 170 carries out periodic reciprocating rectilinear motion on a straight line in a manner same as the first embodiment. In contrast, the first moving part 260 carries out periodic reciprocating motion on a circular path having the tangent orthogonal to the direction of movement of the second moving part 170. That is, the first moving part 260 and the second moving part 170 perform reciprocating motion in a direction where the tangent in the direction of movement of the first moving part 260 and the direction of movement of the second moving part 170 are orthogonal to each other using the independent motors 262 and 172 as the driving sources.

It is thus possible to change the position of the objective lens 150 in the two-dimensional plane and a light focus spot is generated at the center of the objective lens 150, so that it is possible to scan the observation object 5 by movement of the objective lens 150. In the present embodiment, a path of the light focus spot in the x direction of the two-dimensional image generated based on a detection signal by the photodetector 180 becomes an arc as illustrated in an acquired image of FIG. 10.

To describe in more detail, firstly, for the first moving part 260, an actuator having the voice coil rotational axis 264 as the first motor 262. In the first motor 262, by rotating the rotational axis 264 about a rotational center C, the first base 266 is subjected to rotational movement to draw an arc on the xy plane. At this time, the second reflecting mirror 242 is provided at the rotational center C of the rotational axis 264 to face a reflecting surface of the first reflecting mirror 240 on the second base 176. The reflecting surface of the second reflecting mirror 242 is disposed parallel to a reflecting surface of the third reflecting mirror 244 fixed to the first base 266.

In contrast, the second moving part 170 is, in a manner same as the first embodiment, configured with the first moving part 260 placed on the part and to be movable in a direction parallel to the optical axis to be introduced to the first reflecting mirror 240 (that is, y direction). The objective lens 150 thus has the tangent in the direction of movement approximately parallel to the x direction by the first moving part 260 and also becomes movable in the y direction orthogonal to the x direction by the second moving part 170.

Accordingly, it becomes possible to lead laser light to the center of the objective lens 150 at all times by the first moving part 260 and the second moving part 170. As a result, it becomes possible to use the simple lightweight objective lens 150, which significantly reduces load on the first motor 262 functioning as the driving source for the first moving part 260.

In addition, in the present embodiment, the first moving part 260 is equipped with the objective lens 150 and the second moving part 170 is equipped only with the first moving part 260 and the first reflecting mirror 240. That is, in the laser scanning microscope apparatus 200 according to the present embodiment, the spherical aberration correction unit 110, the focus position control unit 120, the beam splitter 130, and the photodetector 180, for example, are not equipped in the moving parts and are fixed to a fixed part. Accordingly, it is possible to reduce members to be moved by the first moving part 260 and the second moving part 170 and to save the weight of the members to be equipped. It is possible to reduce the motor load in each of the moving part 260 and 170 by the weight saving, which enables high speed scanning of a light focus spot and image acquisition for a shorter period of time.

At this time, the control unit controls the moving speed of the first moving part 260 to be faster than the moving speed of the second moving part 170. This enables faster movement of the objective lens 150, high speed scanning of a light focus spot, and image acquisition for a shorter period of time. Further, by allowing independent driving of the first moving part 260 and the second moving part 170, it is possible to enlarge the visual field for a stroke of the motor to enhance the resolution.

2. 3. Summary

The configuration of the laser scanning microscope apparatus 200 according to the second embodiment and the behaviors of the apparatus when scanning a light focus spot are described above. The laser scanning microscope apparatus 200 according to the present embodiment is provided with the first moving part 160 equipped with the objective lens 150, the second reflecting mirror 242, and the third reflecting mirror 244. The laser scanning microscope apparatus 200 is provided with the second moving part 170 movable in a direction orthogonal to the first moving part 260 and equipped with the first moving part 260 and the first reflecting mirror 240. Since the apparatus is configured with small optical components without using a galvano-scanner unlike in the past, this enables miniaturization and slimming of the apparatus. It is also possible to acquire, at high speed, an image of a wide visual field with high resolution by reducing elements to be equipped in each of the moving parts 260 and 170 for weight saving.

Although the detailed descriptions have been given to preferred embodiments of the present disclosure with reference to the appended drawings, the technical scope of the present disclosure is not limited to such examples. It should be understood by those skilled in the art that various modifications, combinations, sub-combinations and alterations may occur depending on design requirements and other factors insofar as they are within the scope of the appended claims or the equivalents thereof.

The effects described in this specification are merely illustrative or exemplary and not limiting. That is to say, the technique according to embodiments of the present disclosure may exhibit other effects that are apparent from the descriptions in this specification to those skilled in the art together with the above effects or instead of the above effects.

Additionally, the present technology may also be configured as below.

(1) A laser scanning microscope apparatus including:
a first moving part equipped with an objective lens and configured to move the objective lens in a first direction; and
a second moving part configured to be movable in a second direction orthogonal to the first moving part and equipped with the first moving part and a reflecting mirror that guides laser light radiated to an observation object and returning light of the observation object in a predetermined direction.
(2) The laser scanning microscope apparatus according to (1), wherein
the first moving part is movable at a speed higher than the second moving part is.
(3) The laser scanning microscope apparatus according to (1) or (2), wherein
a first driving unit configured to move the first moving part in the first direction and a second driving unit configured to move the second moving part in the second direction are controlled independently.
(4) The laser scanning microscope apparatus according to (3), wherein
the first driving unit is a voice coil motor.
(5) The laser scanning microscope apparatus according to any one of (1) to (4), wherein
the first moving part and the second moving part periodically move on straight lines orthogonal to each other.
(6) The laser scanning microscope apparatus according to (5), wherein
the first moving part is configured to be movable in a direction parallel to an optical axis of laser light to be introduced from the reflecting mirror to the objective lens.
(7) The laser scanning microscope apparatus according to any one of (1) to (4), wherein
the second moving part moves periodically on a straight line along the second direction, and
the first moving part moves periodically in a rotational manner on an arc having a tangent in the first direction.
(8) The laser scanning microscope apparatus according to (7), wherein a rotational center of the first moving part is provided with a second reflecting mirror that guides laser light between the reflecting mirror and the objective lens.
(9) The laser scanning microscope apparatus according to any one of (1) to (8), further including:
a focus position control unit configured to adjust a focus position of the objective lens.
(10) The laser scanning microscope apparatus according to any one of (1) to (9), further including:
a spherical aberration correction unit configured to correct spherical aberration.
(11) The laser scanning microscope apparatus according to any one of (1) to (10), further including:
a control unit configured to control moving speed of the first moving part and moving speed of the second moving part.
(12) A control method, in a laser scanning microscope apparatus including a first moving part equipped with an objective lens and configured to move the objective lens in a first direction, and a second moving part configured to be movable in a second direction orthogonal to the first moving part and equipped with the first moving part and a reflecting mirror that guides laser light radiated to an observation object and returning light of the observation object in a predetermined direction, the method including:
controlling moving speed of the first moving part to be at a speed higher than moving speed of the second moving part.

What is claimed is:

1. A laser scanning microscope apparatus comprising:
a first base having an objective lens mounted thereon, the first base being movable in a first direction;
a first driving unit movably coupled to the first base so as to move the objective lens in the first direction;
a second base having the first base, the first driving unit and a reflecting mirror mounted thereon, the second base being movable in a second direction orthogonal to the first direction, wherein the reflecting mirror guides laser light radiated to an observation object and returns light of the observation object in a predetermined direction; and
a second driving unit movably coupled to the second base so as to move the objective lens in the second direction, wherein the first direction and the second direction are orthogonal to an optical axis of the objective lens and wherein the objective lens is movable in a plane.

2. The laser scanning microscope apparatus according to claim 1, wherein
the first base is movable at a speed higher than the second base.

3. The laser scanning microscope apparatus according to claim 1, wherein
the first driving unit is a voice coil motor.

4. The laser scanning microscope apparatus according to claim 1, wherein
the first base and the second base periodically move on straight lines orthogonal to each other.

5. The laser scanning microscope apparatus according to claim 4, wherein
the first base is configured to be movable in a direction parallel to an optical axis of laser light to be introduced from the reflecting mirror to the objective lens.

6. The laser scanning microscope apparatus according to claim 1, wherein
the second base moves periodically on a straight line along the second direction, and
the first base moves periodically in a rotational manner on an arc having a tangent in the first direction.

7. The laser scanning microscope apparatus according to claim 6, wherein
a rotational center of the first base is provided with a second reflecting mirror that guides laser light between the reflecting mirror and the objective lens.

8. The laser scanning microscope apparatus according to claim 1, further comprising:

a focus position control unit configured to adjust a focus position of the objective lens.

9. The laser scanning microscope apparatus according to claim 1, further comprising:
a spherical aberration correction unit configured to correct spherical aberration.

10. The laser scanning microscope apparatus according to claim 1, further comprising:
a control unit configured to control moving speed of the first base and moving speed of the second base.

11. A control method comprising:
providing a laser scanning microscope apparatus including a first base having an objective lens mounted thereon, the first base being movable in a first direction, a first driving unit movably coupled to the first base so as to move the objective lens in the first direction, a second base having the first base, the first driving unit and a reflecting mirror mounted thereon, the second base being movable in a second direction orthogonal to the first direction, wherein the reflecting mirror guides laser light radiated to an observation object and returns light of the observation object in a predetermined direction, and a second driving unit movably coupled to the second base so as to move the objective lens in the second direction; and
controlling a moving speed of the first base to be at a speed higher than a moving speed of the second base, wherein the first direction and the second direction are orthogonal to an optical axis of the objective lens and wherein the objective lens is movable in a plane.

* * * * *